(12) United States Patent
Lemchen et al.

(10) Patent No.: US 7,567,660 B2
(45) Date of Patent: Jul. 28, 2009

(54) MESSAGE PAD SUBSYSTEM FOR A SOFTWARE-BASED INTERCOM SYSTEM

(76) Inventors: Marc S. Lemchen, 553 Park Ave., New York, NY (US) 10021; Rovi Cohen, 3206 Avenue M, Brooklyn, NY (US) 11210

( * ) Notice: Subject to any disclaimer, the term of this patent is extended or adjusted under 35 U.S.C. 154(b) by 917 days.

(21) Appl. No.: 10/938,327

(22) Filed: Sep. 10, 2004

(65) Prior Publication Data
US 2005/0100151 A1    May 12, 2005

Related U.S. Application Data

(63) Continuation-in-part of application No. 10/121,144, filed on Apr. 10, 2002, now Pat. No. 6,792,091, and a continuation-in-part of application No. 10/406,174, filed on Apr. 3, 2003, now Pat. No. 6,937,712.

(60) Provisional application No. 60/358,845, filed on Feb. 22, 2002.

(51) Int. Cl.
*H04M 1/60* (2006.01)
*H04M 9/00* (2006.01)

(52) U.S. Cl. .................. 379/167.11; 379/70; 379/88.11; 379/88.12; 379/88.19; 379/167.12; 379/214.01

(58) Field of Classification Search ............ 379/167.04, 379/167.07, 214.01, 218.02, 221.06, 265.07, 379/266.1, 70, 71, 88.11, 88.12, 88.19, 88.22, 379/142.04, 167.11, 167.12
See application file for complete search history.

(56) References Cited

U.S. PATENT DOCUMENTS

| | | | | |
|---|---|---|---|---|
| 4,850,012 A * | 7/1989 | Mehta et al. | ................ | 379/157 |
| 4,922,526 A * | 5/1990 | Morganstein et al. | ....... | 379/157 |
| 5,276,731 A * | 1/1994 | Arbel et al. | ............ | 379/211.02 |
| 5,469,491 A * | 11/1995 | Morley et al. | ............ | 379/88.13 |
| 5,651,055 A * | 7/1997 | Argade | .................... | 379/88.01 |
| 5,963,626 A * | 10/1999 | Nabkel | .................. | 379/142.01 |
| 6,208,974 B1 * | 3/2001 | Campbell et al. | .............. | 705/3 |
| 6,222,913 B1 * | 4/2001 | Cho | ...................... | 379/142.04 |
| 6,430,405 B1 * | 8/2002 | Jambhekar et al. | .......... | 455/403 |
| 7,130,617 B2 * | 10/2006 | Matsumoto et al. | ...... | 455/412.2 |
| 2003/0152207 A1* | 8/2003 | Ryan | .................... | 379/201.04 |

* cited by examiner

*Primary Examiner*—Binh K Tieu
(74) *Attorney, Agent, or Firm*—Daniel L. Dawes; Marcus C. Dawes

(57) ABSTRACT

The invention is a messaging subsystem used in combination with a software based intercom system for receiving and handling voice telephone calls from a plurality of callers and/or notes. The invention comprises a message pad module resident in the intercom system for capturing information pertaining to the voice telephone calls from the plurality of callers and/or notes. A database stores information obtained from the callers and/or notes other than the captured information. A computer module or program correlates the captured information to the corresponding stored information obtained from the callers and/or notes in the database. In the preferred embodiment, the database comprises a patient treatment database corresponding to treatment provided to a patient, such as a dental or medical history.

17 Claims, 2 Drawing Sheets

MESSAGE PAD SUBSYSTEM FOR A SOFTWARE-BASED INTERCOM SYSTEM

RELATED APPLICATIONS

This application is a continuation-in-part application of U.S. patent application Ser. No. 10/121,144 filed Apr. 10, 2002 now U.S. Pat. No. 6,792,091, which is a continuation of provisional application Ser. No. 60/358,845, filed Feb. 22, 2002, and is also a continuation-in-part application of U.S. patent application Ser. No. 10/406,174, filed Apr. 3, 2003 now U.S. Pat. No. 6,937,712 pursuant to 35 USC 120, both of which applications are incorporated herein by reference.

BACKGROUND OF THE INVENTION

1. Field of the Invention

The invention relates to the field of software based business methods in general and in particular to messaging in interpersonal communications between a plurality of parties.

2. Description of the Prior Art

The conventional voice intercoms are based on hardware and wiring and for the function of messaging, i.e. providing a written record of an incoming call, its content and nature, use recorded voice mails, which are delivered audibly in serial fashion typically without the ability to provide a visual or written record as a series of recorded audio messages. Such conventional intercoms are inadequate in that archiving of the messages for record keeping, sorting and selecting the messages according to any parameter other than perhaps chronology of receipt is impossible.

Even in those cases where some type of response options are provided to the recipient of the message, the nature of the response is very limited, typically restricted to a forwarding or save function of the audio message without any indexing capability for later retrieval other than a first-in-first-out (FIFO) memory.

There is a need for the software based intercom system to include means for creating a visual record of a phone call, data processing or selectively handling the message for record keeping purposes and/or further communications with the caller or others.

BRIEF SUMMARY OF THE INVENTION

The illustrated embodiment of the invention is a messaging subsystem used in combination with a software based intercom system for receiving and handling voice telephone calls from a plurality of callers and/or notes. The invention comprises a message pad module resident in the intercom system for capturing information pertaining to the voice telephone calls from the plurality of callers and/or notes. A database stores information obtained from the callers and/or notes other than the captured information. A computer module or program correlates the captured information to the corresponding stored information obtained from the callers and/or notes in the database.

In the preferred embodiment, the database comprises a patient treatment database corresponding to treatment provided to a patient, such as a dental or medical history.

The computer module automatically stores and correlates the captured information with the information in the database without the necessity for a user command. The computer module automatically stores and correlates the captured information with the information in the database without the necessity for a user command.

The message pad module captures information pertaining to name or names of the patient, the name or names of the caller, the subject matter of the note, the affiliation of the caller, the date or time of the message, the return number of the caller, the person taking the message, the body of the message, the communication status identifier of the message and/or the intended recipient of the message.

The computer module comprises at least one data filter and a module for searching, selecting and displaying the messages selected according to the at least one data filter. The data filter searches, selects and displays the messages according to the intended recipient of the message, the name or names of the caller, the subject matter of the note such as identified by a keyword or keywords in the body of the message, the affiliation of the caller, the communication status identifier of the message, the date or time of the message, and/or the name or names of the patient which is the subject of the message as captured by the message pad module.

The messaging subsystem further comprises a module for selectively replying to the messages, archiving or deleting the messages, and/or for selectively printing the messages.

In the illustrated embodiment the intercom system comprises at least one user station and displays a banner at the user station in which message alerts are displayed. The messaging subsystem is accessed directly from the banner. Alternatively, the messaging subsystem is accessed from a user input command at the user station.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

Figure 1:
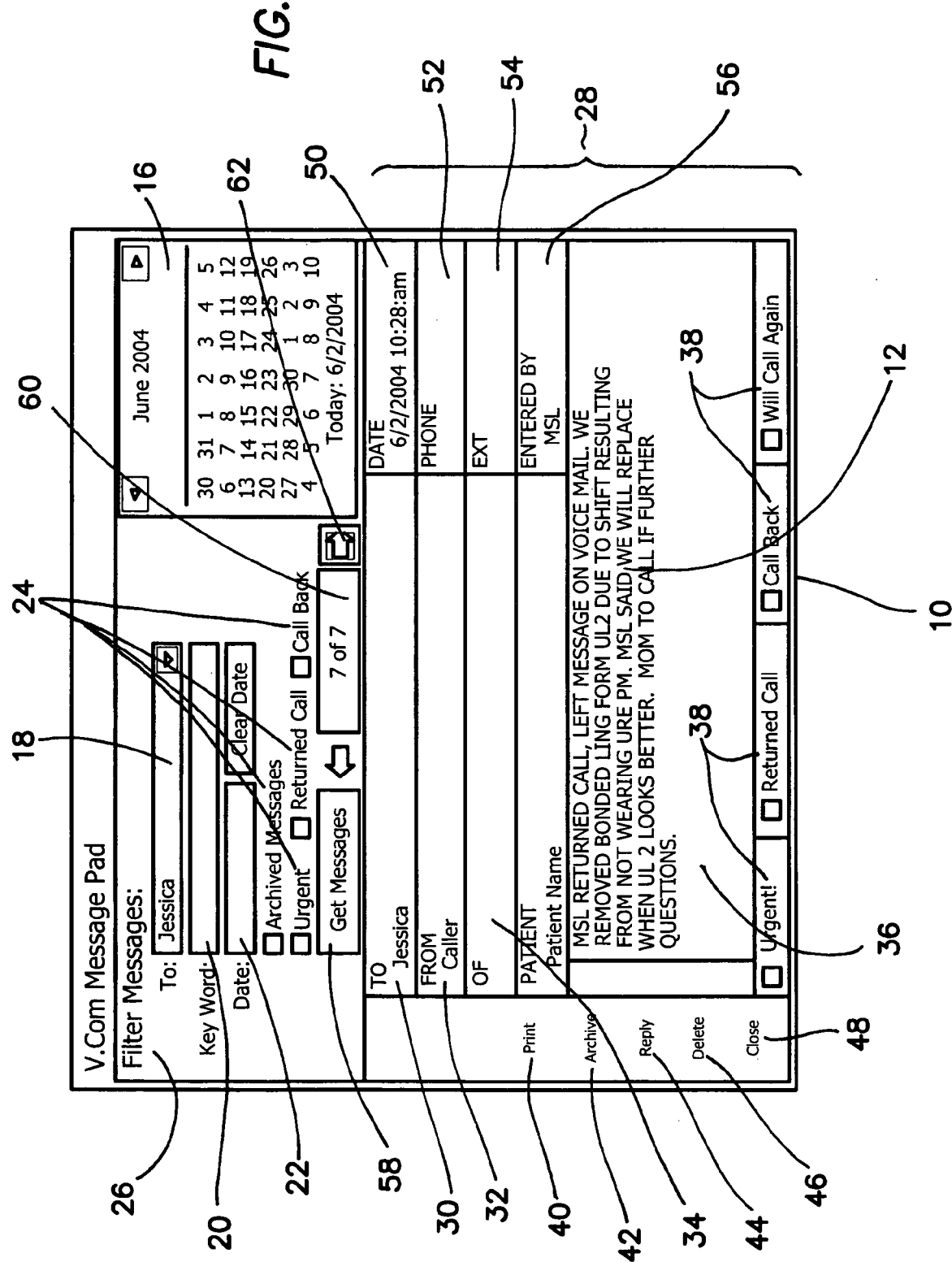
FIG. 1 is a depiction of the message pad display screen showing the various data fields, data filters and message operations of the illustrated embodiment.
Figure 2:
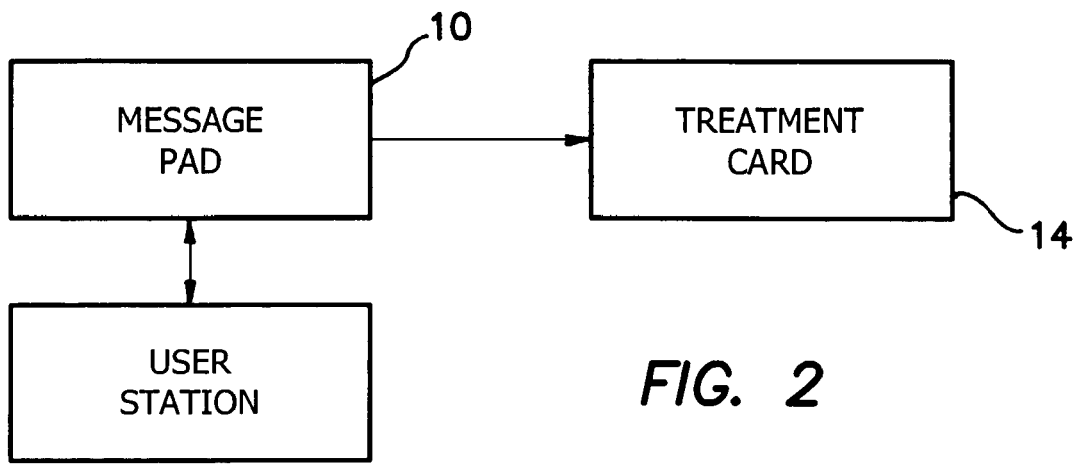
FIG. 2 is a block diagram of the relevant software modules of the intercom system involved in the invention.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Background on the Intercom System

By way of background consider first the context in which the Message Pad function disclosed below will illustratively be employed. The Message Pad is used in a software based intercom system. It must be understood however, that other organizations for the intercom system illustrated can be combined with the disclosed Message Pad without departing from the scope of the invention. The intercom system is implemented on a computer network comprising a plurality of computers networked together over a local area network (LAN) or over the Internet, which computers correspond to a respective plurality of users.

In the illustrated embodiment the intercom system includes a software driven dispatcher which resides in any one of the computers with a set of computer readable instructions for performing various functions including: routing messages, assigning individual audible tones to users, assigning message codes, displaying messages in order of priority by time of entry or other criteria, allowing pre authoring of messages, and designating station numbers. The dispatcher also permits several additional functions in accordance with user input from any of the modules on the computers of the network. These additional functions are initiated by the users. An example of such a function is filtering individual(s) or groups of individuals. However, the actual filtering is performed by the dispatcher software based on the user selected functions from respective stations. In the illustrated embodiment the actual filtering is performed in the intercom module, but it can also be performed in both the intercom and dispatcher software.

The software driven intercom has a software module that resides in each member computer of the system with a set of computer readable instructions for sending, receiving and filtering messages. The software modules also facilitate modifying the placement, size, color, display format, and the time duration and priority of a display. The display format may include user selectable options including scrolling or page changing a list of messages on a message banner of a display on respective computers of the system. The software allows the sender to be reminded if there is no response and gives the sender the option to delete the message or resend a message alert tone without losing priority in placement on the message cue. This can also be set to delete a message to which a response has been given on screen after a preset time period.

The intercom system has software that controls the displays and the running of the system program. The network-based intercom system software prevents or inhibits interference by the system with existing software which is currently running on the system.

The intercom system provides symbols and/or indicators indicating which of the messages in the list of messages was the first message to be entered so that a user can see the beginning, the end, and a sequence of messages between.

Messages are accompanied by a tone or voice that alerts an addressee that a message has been received, generates a selectable display on top of the screen, which moves down any other program or screen information, or displays a message which disappears after a preset time following posting. Preferably, this tone is a unique tone that permits an addressee to distinguish one message from another with the present invention. To this end, users are preferably assigned different tones or sounds to signal the addressee when a message has been sent. This unique tone or voice may be in the form of a special tone, the addressee's own voice, or the addressee's name, any of which can be programmed into the system.

The present invention further advantageously requires no intervention on behalf of the recipient in order to receive a message. The system causes the messages to automatically appear in the banner on the recipient's monitor by software control. The messages scroll, flash, or are otherwise displayed. The system can be set to automatically shrink the banner and park it on the toolbar, or otherwise place it in the background, after a predetermined length of time after the message has been received. A user on any one of the member computers may program the length of time that the messages are to be displayed before being hidden or placed in the background.

As can be understood from the disclosure above, the network-based intercom system relates to visual communication systems, and more specifically to an internal communication system having the ability to efficiently formulate and display a message in a visual form. One of the specific features of the network-based intercom is that it calls the attention of the recipient without requiring an immediate response. This is of particular interest in order to avoid distracting the recipient from other, higher-priority activities at the moment the message is received. This feature is of particular interest in the medical fields since interruption of procedures may impact negatively on the outcome of the procedure. On the other hand, this feature is also advantageous in other settings and will be especially beneficial to support personnel such as for receptionists, for example. A major advantage of the network-based intercom is that it accomplishes these functions and advantages without the need of any dedicated hardware besides an already existing computer network.

As can be appreciated, a response can be generated in the form of a separate message initiated by the addressee of a previous message. In this way the response appears together with all other messages displayed in the message field of the banner. Such a response may be distinguished as the response primarily due to its context, sender, addressee, and where it falls in the sequence of messages. While responses of this form are usually acceptable, they require an unnecessary inclusion of at least one of an addressee and location. This is considered to be unnecessary because the addressee is implied by the sender of the message being answered and his or her location. Hence a preferred system and method includes direct responses to messages in the message banner.

Whenever a message is generated, and is not limited by the settings, it appears in the message field of the banner of all the participating stations. At least a portion of the visual display of the message or an icon that is positionally associated with the message is clickable for direct addressee interface in order to respond to the message. Hence, when an addressee sees his or her own message or hears his or her unique audio alert tone, he or she may respond directly to the message by clicking on the portion of the visual display of the message that initiates a response. Preferably, clicking on an icon associated with the message brings up a dialog box containing preprogrammed messages associated specifically with the message to which a response is being made, or a box into which a custom message may be typed. For example, if the message is the fact that there is an incoming phone call, the preprogrammed response may be "hold", "take a message", "leave a phone number", "I will call back" and the like. When the response is completed, it is appended to the particular message that was answered and is displayed in a positionally associated location relative to the message in the message field of the banner. Alternatively, the message may be responded to directly by right clicking anywhere on the banner. This generates a pull down menu. From the pull down menu, an addressee may select response and the particular message to which he or she wished to respond. This selection brings up the dialog box with preset responses and the custom response box as set forth above.

The preset responses can be programmed into the dispatcher in a response settings portion of the dispatcher module. Response can also be to log the message for later delivery in the print or screen modes.

Banner options include selectively choosing the position of the banner, its size, color, font, display format, speed of flashing or scrolling, and other aspects of the banner display as described below. The banner may be set to always be in front, in which case the predetermined time before hiding the banner may also be selected. The audio alerts may also be selectively turned off in these settings. Preferably, the banner may be set to automatically appear vertically on top of the screen on which it is displayed without overlapping any other window or display, or always in front of other windows and applications. Preferably, the banner settings include selectively providing at least one of an audio and a visual alert signal to the sender and/or to the addressee at a predetermined period of time after a message has not been answered. Upon receiving the alert signal, the sender can choose to delete or resend the message, or send a new message. The banner settings also preferably include selectively providing automatic deletion of a message when no response has been received for a predetermined time period. Additionally, or alternatively, it is contemplated that the banner settings may include automatically deleting messages after a predetermined period of time after they have been answered.

Thus the context of the invention comprises a software control based system, a method of providing such an intercom system, a method of using, and an actual user interface that includes the visual displays, the clickable icons or labels, and the audio signals. The messages and responses can be initiated and completed in a variety of ways that are recognized by the system under software control.

While in the preferred embodiment, the system generally relies upon text input or other manual actuation for formulating and sending messages, the system may alternatively or additionally include one or more of voice activated message initiation, voice actuated message formulation, and possibly even voice activated user selection of options. Voice or command recognition technology including voice or speech recognition software may be integrated in the system to achieve a partially or fully voice actuated network-based intercom system.

The voice actuated system could be actuated by an assistant at a patient's chair or anywhere in the room, for example. In this way, a message could be created by the assistant requesting that the doctor come to a particular chair or location.

Alternatively, a remote control device could be employed in combination with the system. The remote control device of the instant invention can either be carried by the user or installed at a site. For example, a remote control device may be included with or integrated into a chair structure or on a cabinet. The present invention also includes the ability to selectively, automatically identify the sender and the source location of a message. Like many other features of the system, this can be set by user selection of this option.

The Illustrated Embodiment of the Message Pad

Turn now to the message pad function of the illustrated embodiment as implemented in the above described intercom system. When a voice-based telephone phone call is received by the dental or medical receptionist or when anyone sends a message by any other means now known or later devised, the telephone receptionist fills out a message pad or simply message 10 on his or her computer terminal which has a visual format similar to a conventional paper phone message pad as shown in the depiction of FIG. 1.

Message 10 is comprised of a section denoted as the message body 28 and a section denoted as the message filter 26. Consider first the message body 28. The intended recipient of the message is input into data field 30. Entry of a name or some recognizable form of the name is used in a lookup table stored in the system to route the message to the station(s) used by the named person or to display the specific message 10 for that person at the appropriate station when called up from the banner described above. The name of the caller, which may or may not be the same as the patient is entered into data field 32. Field 34 provides a field for the affiliation of or other information pertaining to the identity, nature of the caller, or subject matter of the note to be entered and associated with the caller and message 10. For the purposes of this specification any information associated with the caller other than the caller's name shall be referenced as the caller's "affiliation".

In the context of a dental or medical office, if the message 10 relates to a patient, the receptionist enters the patient's name in data field 12 of message screen 10 and the entire or partial data content of message 10 is automatically entered into the patient's treatment card or record 14, which is a dedicated portion of the network memory of the intercom system in which memory a patient database is stored. The various portions of the content of message 10 are automatically entered into record 14 as message 10 are filled out without the need for the receptionist to remember or perform a memory save operation. Thus, there is no need to manually enter the data of message 10 into the medical record 14 as is typical with most medical and dental databases. Display of the treatment card for any given patient can selectively or automatically display all or any part of the collective message pad 10 corresponding to that patient.

The date and time of the call is entered into field 50, and the phone number of the caller or at least the phone number considered relevant to message 10 is entered into field 52 and the extension, if any, into field 54. An email address or fax number may also be inserted into field 52. For the purposes of this specification the return telephone number, fax number or email address shall be referenced collectively as the "return number". The name, initials or other identifier of the person who took the message, typically the receptionist, is entered into field 56. The body of the actual message as determined by the receptionist is entered as text into field 36 into which nontextual messages may also be imported or pasted.

A communication status identifier 38 relating to the message 10 may also be entered, which is here indicated as one or more of four types, namely Urgent, Returned Call, Call Back, or Will Call Again. Any other type of communication status identifier 38 in addition to or instead of those illustrated could also be employed.

Consider now the filter section 26 of message 10. The various fields of section 26 denote those fields of section 28 which can be selectively searched. It is thus to be understood that the selection of searchable fields is not limited to those illustrated, but can include any combination of fields of section 28 as well as the introduction of new fields, which are not explicitly shown in the illustrated embodiment. Field 18 is provided for entry of the intended recipient of the message corresponding to field 30 of section 28. Field 20 allows a keyword or words from the message body 36 to be entered which can then be later used for keyword searching, sorting and/or retrieval of messages. Any database function or processing desired can be employed with message pad 10 using one or more keyword fields 20. Field 22 is provided to allow for date and time entries corresponding to field 50 of section 28. Field 24 corresponds to filters for searching messages depending on the communication status identifier 38 in section 28. Once the various filters are entered a search and display of the selected messages 10 are generated by clicking on the field bar 58. The total number of messages retrieved and the displayed message on the screen is displayed in field 60. Sequencing up or down the queue of retrieved messages 10 is performed by clicking on arrow fields 62.

Figure 3:
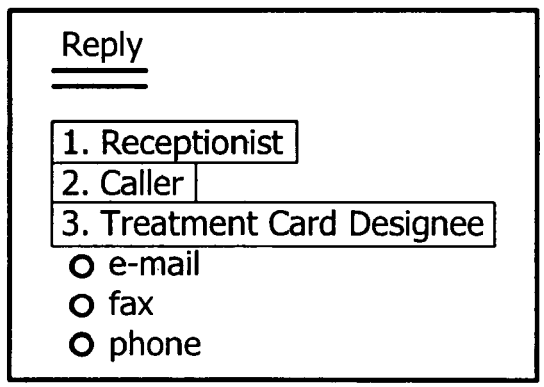
FIG. 3 is a diagram of the Reply dropdown screen of the illustrated embodiment.

The invention also provides the ability to selectively reply to the caller from the message pad 10, to reply to receptionist who enters the message 10 or to anyone else who is designated into the computer's treatment card 14 by selecting the reply field 44. A drop down screen shown in FIG. 3 provides the different reply options upon clicking on reply field 44. Replies may be implemented by automatically addressed emails or faxes coupled to an address database or by automatically dialed telephone numbers which originate voice telephone calls which are then automatically routed to a headset, handset or speaker phone at the user's station.

If it is desired to save message 10, then clicking on the archive field 42 will store the displayed message 10 in memory in the intercom system from which it can be retrieved using the fields of filter section 26 described above. Alternatively, if it is desired to delete the message from the system, delete field 46 is selected. The deleted message 10 can be automatically archived in a deleted file for a selected time interval, which could also be subject to selective retrieval.

Figure 4:
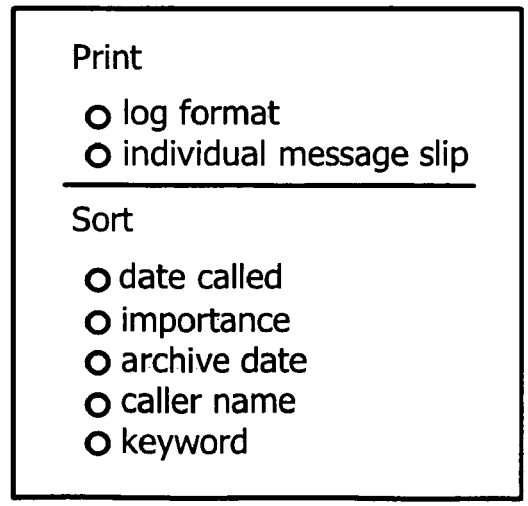
FIG. 4 is a diagram of the Print dropdown screen of the illustrated embodiment.

The message 10 can be printed to provide a hardcopy if desired by clicking on the print field 40. A drop down menu as depicted in FIG. 4 can be provided to allow printed copies, summaries or reports in a variety of formats, such as printing all the messages received in a log form or as individual messages in a format simulative to a paper message pad. Messages can be sorted in a printing or report by date, importance, archive date, person and/or keyword. The result is that the dentist or medical practitioner no longer has phone messages on his phone voicemail or paper messages on his or her desk. The dentist or medical practitioner can call up his or her messages, read them, archive them, delete them, and/or respond to them in an intelligent and orderly manner with confidence.

Other data input fields in message pad 10 include a monthly calendar display 16 with a flagged date for ease of visualization, typically the date the message was created or taken by the receptionist.

The fact of an arrival of a message that is first displayed in a banner can be selected by clicking on the banner and automatically entering it into the message pad 10 so there is a direct link from message alerts in the banner to the actual message of FIG. 1 that is saved in the message pad 10. The message pad operates independently of the message alert in the banner, so that message pad 10 can be entered directly by a toolbar selection, keystroke, voice command or other computer activation method if desired.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A patient-messaging subsystem used in combination with a software based intercom system for receiving and handling voice telephone calls from a plurality of callers and for receiving and/or handling notes comprising:
   a message pad module resident in the intercom system for automatically capturing call information pertaining to the voice telephone calls from the plurality of callers and/or notes;
   a database for storing patient related information obtained from the callers and/or notes other than the captured call information; and
   computer means for automatically correlating the captured call information to the corresponding stored patient related information obtained from the callers and/or notes in the database,
   wherein the computer means comprises at least one data filter and means for searching, selecting and displaying a patient-related message selected by the at least one data filter according to selected aspects of the call information and/or patient related information in the database.

2. The messaging subsystem of claim 1 where the database comprises a historical patient treatment database corresponding to treatment provided to a patient.

3. The messaging subsystem of claim 1 where the message pad module captures information pertaining to affiliation of the caller.

4. The messaging subsystem of claim 1 where the message pad module captures information pertaining to a person taking the message.

5. The messaging subsystem of claim 1 where the message pad module captures information pertaining to the body of the message.

6. The messaging subsystem of claim 1 where the message pad module captures information pertaining to the communication status identifier of the message.

7. The messaging subsystem of claim 1 where the data filter searches, selects and displays the messages according to the intended recipient of the message as captured by the message pad module.

8. The messaging subsystem of claim 1 where the data filter searches, selects and displays the messages according to the name or names of the caller and/or subject matter of the note as captured by the message pad module.

9. The messaging subsystem of claim 1 where the data filter searches, selects and displays the messages according to the affiliation of the caller as captured by the message pad module.

10. The messaging subsystem of claim 1 where the data filter searches, selects and displays the messages according to a keyword in the body of the message as captured by the message pad module.

11. The messaging subsystem of claim 1 where the data filter searches, selects and displays the messages according to the communication status identifier of the message as captured by the message pad module.

12. The messaging subsystem of claim 1 where the data filter searches, selects and displays the messages according to the date or time of the message as captured by the message pad module.

13. The messaging subsystem of claim 1 further comprising means for selectively archiving or deleting the messages.

14. The messaging subsystem of claim 1 further comprising means for selectively replying to the messages.

15. The messaging subsystem of claim 1 further comprising means for selectively printing the messages.

16. The messaging subsystem of claim 1 where the intercom system comprises at least one user station and displays a banner in at least one user station in which message alerts are displayed and where the messaging subsystem is accessed directly from the banner.

17. The messaging subsystem of claim 1 where the intercom system comprises at least one user station and where the messaging subsystem is accessed from a user input command at the user station.

* * * * *